US010367809B2

(12) United States Patent
Dixon et al.

(10) Patent No.: US 10,367,809 B2
(45) Date of Patent: *Jul. 30, 2019

(54) DEVICE REGISTRATION, AUTHENTICATION, AND AUTHORIZATION SYSTEM AND METHOD

(71) Applicant: Level 3 Communications, LLC, Broomfield, CO (US)

(72) Inventors: Allen E. Dixon, Arvada, CO (US); Steven M. Rdzak, Arvada, CO (US); Christopher T. Swift, Boulder, CO (US); Rene Grippo, Boulder, CO (US); Jeff Scheufele, Lafayette, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 10 days.

This patent is subject to a terminal disclaimer.

(21) Appl. No.: 15/856,779

(22) Filed: Dec. 28, 2017

(65) Prior Publication Data

US 2018/0124044 A1 May 3, 2018

Related U.S. Application Data

(63) Continuation of application No. 14/320,179, filed on Jun. 30, 2014, now Pat. No. 9,860,241.

(Continued)

(51) Int. Cl.
*H04L 29/06* (2006.01)
*H04W 12/06* (2009.01)
(Continued)

(52) U.S. Cl.
CPC ........ *H04L 63/0838* (2013.01); *H04L 63/083* (2013.01); *H04L 63/0807* (2013.01);
(Continued)

(58) Field of Classification Search
CPC . H04L 63/083; H04L 63/0838; H04L 63/126; H04L 9/3226; H04L 63/0807; H04L 9/3242; H04W 12/08
(Continued)

(56) References Cited

U.S. PATENT DOCUMENTS 8,868,915 B2 * 10/2014 Counterman ......... G06F 21/335
713/176
2012/0023556 A1 * 1/2012 Schultz .................. G06F 21/41
726/4

(Continued)

FOREIGN PATENT DOCUMENTS

WO WO-2013030832 A1 3/2013

OTHER PUBLICATIONS

International Preliminary Report on Patentability, dated Oct. 18, 2016, Int'l Appl. No. PCT/US15/025647, Int'l Filing Date Apr. 14, 2015; 5 pgs.

(Continued)

*Primary Examiner* — Farid Homayounmehr
*Assistant Examiner* — Sanchit K Sarker (57) ABSTRACT

A system includes one or more processors to receive a registration request, the registration request comprising a representation of a username and a password, verify the username and the password and transmit a one-time-use password, receive the one-time-use password and first device identifier information from a mobile computing device, receive an access request from the mobile computing device comprising the representation of the username and the password, second device identifier information, and application key information, verify the username, the password, the second device identifier information, and the application key information, and transmit a token to the mobile computing device, and receive a resource request (Continued)

from the mobile computing device comprising the token and third device identifier information.

20 Claims, 4 Drawing Sheets

Related U.S. Application Data

(60) Provisional application No. 61/979,809, filed on Apr. 15, 2014.

(51) Int. Cl.
*H04W 12/08* (2009.01)
*H04L 9/32* (2006.01)

(52) U.S. Cl.
CPC ........ *H04L 63/0876* (2013.01); *H04L 63/126* (2013.01); *H04W 12/06* (2013.01); *H04W 12/08* (2013.01); *H04L 9/3226* (2013.01); *H04L 9/3242* (2013.01); *H04L 2463/082* (2013.01)

(58) Field of Classification Search
USPC ........................................................ 713/181
See application file for complete search history.

(56) References Cited

U.S. PATENT DOCUMENTS

| | | | | |
|---|---|---|---|---|
| 2012/0054841 | A1* | 3/2012 | Schultz | G06F 21/44 726/6 |
| 2012/0144202 | A1* | 6/2012 | Counterman | G06F 21/335 713/176 |
| 2012/0331526 | A1* | 12/2012 | Caudle | G06F 21/6209 726/4 |
| 2013/0179692 | A1* | 7/2013 | Tolba | H04L 63/08 713/179 |
| 2014/0004832 | A1 | 1/2014 | Dabbiere et al. | |
| 2014/0032691 | A1 | 1/2014 | Barton et al. | |
| 2014/0032697 | A1 | 1/2014 | Barton et al. | |
| 2014/0040628 | A1 | 2/2014 | Fort et al. | |
| 2014/0057599 | A1 | 2/2014 | Hazari | |
| 2014/0068252 | A1* | 3/2014 | Maruti | H04L 9/0866 713/162 |
| 2014/0101434 | A1 | 4/2014 | Senthurpandi et al. | |
| 2014/0101453 | A1* | 4/2014 | Senthurpandi | H04L 63/0861 713/172 |
| 2014/0189781 | A1* | 7/2014 | Manickam | H04L 67/34 726/1 |
| 2014/0289833 | A1* | 9/2014 | Briceno | H04L 63/08 726/7 |
| 2014/0323049 | A1* | 10/2014 | Park | H04W 4/80 455/41.2 |
| 2015/0121501 | A1* | 4/2015 | Khalid | H04L 63/0815 726/8 |
| 2015/0295930 | A1* | 10/2015 | Dixon | H04L 63/083 713/181 |
| 2016/0094540 | A1* | 3/2016 | Camenisch | H04L 63/0815 713/155 |

OTHER PUBLICATIONS

International Search Report, dated Jul. 28, 2015, Int'l Appl. No. PCT/US15/025647, Int'l Filing Date Apr. 14, 2015; 3 pgs.

Written Opinion of the International Searching Authority, dated Jul. 28, 2015, Int'l Appl. No. PCT/US15/025647, Int'l Filing Date Apr. 14, 2015; 3 pgs.

Extended European Search Report, dated Nov. 14, 2017, Application No. 15779771.3, filed Apr. 14, 2015; 7 pgs.

* cited by examiner

DEVICE REGISTRATION, AUTHENTICATION, AND AUTHORIZATION SYSTEM AND METHOD

CROSS-REFERENCE TO RELATED APPLICATION

This application is a continuation of and claims the benefit of priority from U.S. patent application Ser. No. 14/320,179, filed Jun. 30, 2014, entitled "Device Registration, Authentication, and Authorization System and Method," the entire contents of which are fully incorporated by reference herein for all purposes. Application Ser. No. 14/320,179 claims the benefit of priority from U.S. Provisional Application No. 61/979,809, filed Apr. 15, 2014, entitled "Device Registration, Authentication, and Authorization System and Method," the entire contents of which are fully incorporated by reference herein for all purposes.

TECHNICAL FIELD

The present disclosure generally relates to bring-your-own-device (BYOD) systems and methods. In particular, the embodiments relate to systems and methods for registration, authentication, and authorization of computing devices with a server having access to network resources, and distribution of tokens to the computing devices. The server transmits representations of requested resources to computing devices having valid tokens.

BACKGROUND

In order to provide flexible work environments, many employers and associated information technology (IT) departments are providing remote network access to employees. In addition, the employers often allow employees to connect their personal computing devices to the company's network and access network resources. However, when an employee leaves a company or loses a computing device, the company may want to terminate access for the computing device to the company network and resources provided by the company network. Conventional methods of terminating access to the computing device are overly restrictive and destructive of personal data on the computing device.

As an example, a commercial product may provide mobile device management (MDM) for enterprises. An employee of an employer utilizing the commercial product for MDM of a personal mobile computing device may accidentally leave the mobile computing device on an airplane. In another situation, the employee may accept a new position with another employer. This mobile computing device may have personal data including personal photographs, videos, email, and applications and employer related data including emails, applications, and documents containing confidential employer information. The mobile computing device also may provide access to employer networks.

Conventionally, based on current limitations and/or security policies, the IT department of the employer may have no choice but to remotely delete/wipe all data from the mobile computing device and/or perform a factory reset of the mobile computing device. In another case, the employer may remotely lock the mobile computing device. While this provides security for the employer, this presents challenges for the employee. The employee or former employee may not have access to the personal mobile computing device. In other situations, in the event that the employee does not backup the personal data on the personal mobile computing device, the employee or former employee may lose the personal data. The IT department of the employer may also have to disable access to an employer related application for all employees.

SUMMARY

Briefly described, and according to one embodiment, aspects of the present disclosure generally relate to bring-your-own-device (BYOD) systems and methods. In one aspect, a server registers, authenticates, and authorizes a computing device to access network resources. The access may be based on multiple factors including a username, a password, application key information, and device identifier information. In an initial request, the computing device sends a username, password, application key information, and device identifier information to the server. The server may verify the validity of the username, password, and the application key information and store the device identifier information in a database. The server may provide the computing device with a token for accessing the network resources. In subsequent requests, the computing device sends the token and device identifier information to the server and the server verifies the validity of the token and the device identifier information. The server transmits representations of requested resources to computing devices having valid tokens and valid device identifier information.

According to one aspect, a system includes at least one processor to receive a registration request, the registration request comprising a representation of a username and a password, verify the username and the password and transmit a one-time-use password, receive the one-time-use password and first device identifier information from a mobile computing device, receive an access request from the mobile computing device comprising the representation of the username and the password, second device identifier information, and application key information, verify the username, the password, the second device identifier information, and the application key information, and transmit a token to the mobile computing device, and receive a resource request from the mobile computing device comprising the token and third device identifier information.

According to another aspect, a method includes receiving, by at least one processor, a registration request, the registration request comprising a representation of a username and a password, verifying, by at least one processor, the username and the password and transmitting a one-time-use password, receiving, by the at least one processor, the one-time-use password and first device identifier information from a mobile computing device, receiving, by the at least one processor, an access request from the mobile computing device comprising the representation of the username and the password, second device identifier information, and application key information, verifying, by the at least one processor, the username, the password, the second device identifier information, and the application key information, and transmitting a token to the mobile computing device, and receiving, by the at least one processor, a resource request from the mobile computing device comprising the token and third device identifier information.

According to an additional aspect, a non-transitory computer-readable medium includes instructions stored thereon that, when executed by at least one processor, cause the at least one processor to perform operations comprising receiving a registration request, the registration request comprising a representation of a username and a password, verifying the username and the password and transmitting a one-time-use password, receiving the one-time-use password and first device identifier information from a mobile computing device, receiving an access request from the mobile computing device comprising the representation of the username and the password, second device identifier information, and application key information, verifying the username, the password, the second device identifier information, and the application key information, and transmitting a token to the mobile computing device, and receiving a resource request from the mobile computing device comprising the token and third device identifier information.

These and other aspects, features, and benefits of the present disclosure will become apparent from the following detailed written description of the preferred embodiments and aspects taken in conjunction with the following drawings, although variations and modifications thereto may be effected without departing from the spirit and scope of the novel concepts of the disclosure.

DETAILED DESCRIPTION

Traditionally, employers provided employees with computing devices for use in the workplace, and did not allow the computing devices to leave the premises. The employers controlled what hardware and software was allowed for use with network resources by limiting network access to approved hardware and software. Some employers then began to allow employees to utilize employer-provided mobile computing devices and access network resources remotely. However, many employers are no longer selecting computing devices for their employees and let their employees choose their own computing devices including computers, smartphones, and tablets. Many employers are now providing bring your own device (BYOD) programs whereby employers allow employees access to corporate network resources from anywhere including at the workplace and at remote locations, e.g., at home, in coffee shops, in airports, and in hotel rooms, among other locations. While this may be desirable from an employee perspective and even an employer perspective, this potentially leaves the corporate network resources at risk and complicates the task of the securing the corporate network resources. If an employee leaves an employer or a mobile computing device is lost, stolen and/or compromised, many employers delete or wipe all data stored in memory on the employee-owned mobile computing device. This is undesirable. Some employers would prefer to be more accommodating. However, current options do not provide solutions.

Aspects of the present disclosure involve systems, methods, computer program products, and the like, for registering a computing device, authenticating the computing device, and authorizing the computing device. The systems, methods, and computer program products comprise a security harness for network resources accessible on a communications network. First, a computing device is registered to use and access network resources by storing device identifier information in a database. After the computing device is registered, the computing device transmits a username, a password, application key information, and device identifier information for validation by a server. If the server validates the username, the password, the application key information, and the device identifier information, the server generates a token having a time-to-live or an expiration time to the computing device. After receiving the token, the computing device may send a request for network resources including the token and the device identifier information. The server receives the request and the token, verifies that the token and the device identifier information are valid, finds the network resources, and transmits a representation of the network resources to the computing device. In the event that the computing device is lost, stolen, or otherwise compromised, the token may be disabled and/or the device identifier information may be deleted from the database, disabling the computing device from requesting network resources for a specific application. An administrator may manually mark the computing device as inactive in a database or may disable the computing device by using a web-based management portal hosted by the server. In another example, the device identifier information may be deleted or removed from the database by using the web-based management portal. If the computing device is inactive and does not make any request for network resources for a particular period of time, e.g., twelve months or some other configurable parameter, the device identifier information may be automatically removed or deleted from the database.

The security harness may disable a specific application on a specific computing device without modifying any other data in memory on the computing device. If the user chooses to delete the specific application, the computing device may notify the administrator and/or the database. As an example, the administrator may receive a notification via the web-based management portal. The administrator may manually mark the computing device as inactive in the database or may disable the computing device by using the web-based management portal. The administrator also may delete or remove the device identifier information from the database. As another variant, the device identifier information may be automatically removed or deleted from the database.

Further, in one particular implementation, employees use their own computing devices to access network resources provided by an employer. A server verifies an entity's identity and determines what network resources an authenticated entity is allowed to access, e.g., read, write, and/or modify. According to an example embodiment, an entity is authenticated using multi-factor authentication. The embodiments described herein are further based on Oauth, an open standard for authorization. In particular, the embodiments are related to Oauth 2.0. While discussed in the context of Oauth, the present disclosure is not limited to Oauth.

As an example, when a user first uses a mobile computing device and opens an application that requests access to network resources, the application transmits a request for access to a network server. The network server determines that this mobile computing device has not yet been granted access to network resources. Before access is provided, the mobile computing device is registered. The server generates a one-time-use password (OTP) or other password and transmits the one-time-use password to the user via email and/or text message, among other methods. The user receives the one-time-use password and transmits the one-time-use password to the server along with a device identifier that is a universally unique identifier for identifying this particular mobile computing device. The server verifies that the one-time-use password is correct and stores the device identifier in a memory.

Now that the mobile computing device is registered, the user and associated mobile computing device may obtain access to the network resources. Using the application, the user inputs a username and password and the application transmits a representation of the username and password in addition to other information to the server. The other information may include application key information including an application key that represents a unique identifier for the application and an application key secret. The other information may further include device identifier information including a representation of a device identifier and a device identifier secret. The server receives this information and verifies that the username and password, the application key information, and the device identifier information are valid. If this information is valid, the server generates a token that may have a time-to-live or expiration time, e.g., two hours. The server transmits this token to the mobile computing device. Upon receipt of this token, the mobile computing device may access the network resources. The mobile computing device transmits a request to the server with the token and the device identifier information. The server verifies that the token and the device identifier is valid, obtains the network resources from a memory or database and transmits a representation of the network resources to the mobile computing device.

Figure 1:
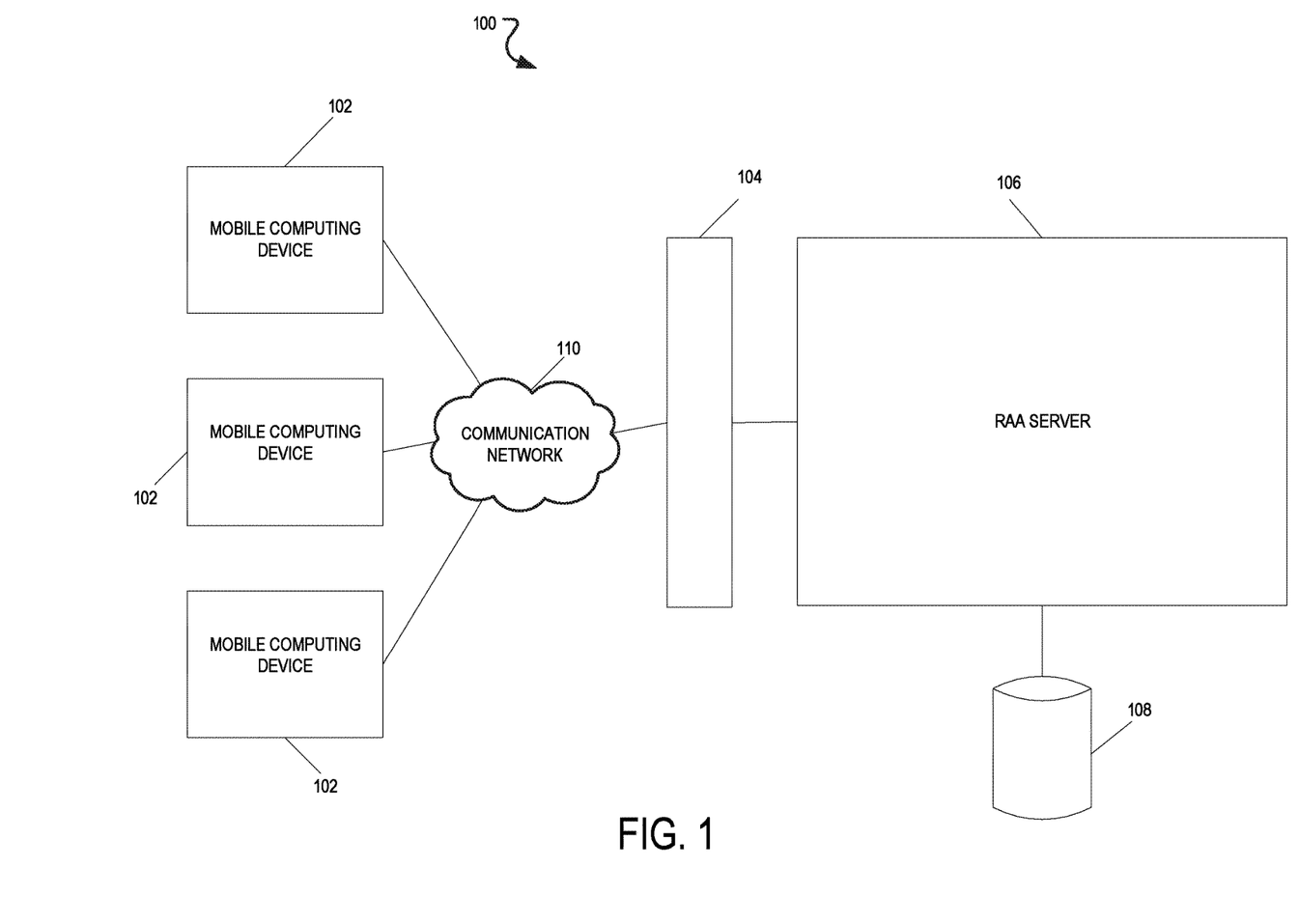
FIG. 1 is a block diagram of a computing device registration, authentication and authorization (RAA) system according to an example embodiment.

FIG. 1 illustrates a block diagram of a computing device registration, authentication, and authorization (RAA) system 100 according to an example embodiment. According to an aspect of the disclosure, the RAA system 100 includes one or more mobile computing devices 102. The RAA system 100 further comprises one or more firewalls 104, one or more RAA servers 106, one or more databases 108, and a communication network 110. The RAA system 100 includes one or more computers that communicate using the communication network 110. The one or more computers communicate and coordinate their actions by passing messages over the communication network 110. The network can be the Internet, an intranet, a cellular communications network, a WiFi network, a packet network, or another wired or wireless communication network. As an example, the one or more computers communicate data in packets, messages, or other communications using a common protocol, e.g., Hypertext Transfer Protocol (HTTP) and/or Hypertext Transfer Protocol Secure (HTTPS). As an example, the RAA system 100 may be a cloud-based computer system.

The firewall 104 receives requests from the one or more mobile computing devices 102 and routes the requests to the one or more RAA servers 106. The firewall 104 may be a software and/or hardware-based network security system that controls the incoming and outgoing network traffic by analyzing the requests and determining whether the requests should be allowed or not allowed, based on a rule set. In one exemplary embodiment, the firewall 104 is a Netscaler application delivery controller providing load balancing for requests, network scalability, RAA system 100 monitoring, and management features.

The one or more databases 108 comprise an organized collection of data. The data may include one or more tables comprising username and password information, device identification information, application information including application key information, and token information, among other information. The username and password information may be stored in a lightweight directory access protocol (LDAP) database, e.g., an Active Directory store. The device identification information may include a device identifier and a device identifier secret for each device and an associated username. The device identifier may comprise a device fingerprint uniquely representing the device. The application information may include an application key and an application key secret for each application providing access to network resources. The application key may comprise an application fingerprint uniquely representing the application. The application information may be stored in an OpenDS directory server, e.g., a network-accessible database that stores information in a hierarchical form.

In one embodiment, the data in the one or more databases 108 also may include one or more tables comprising network resources requested by the mobile computing device 102. In another embodiment, the network resources requested by the mobile computing device 102 may be stored in another database or other network addressable location, service, memory, or computer.

Figure 2A:
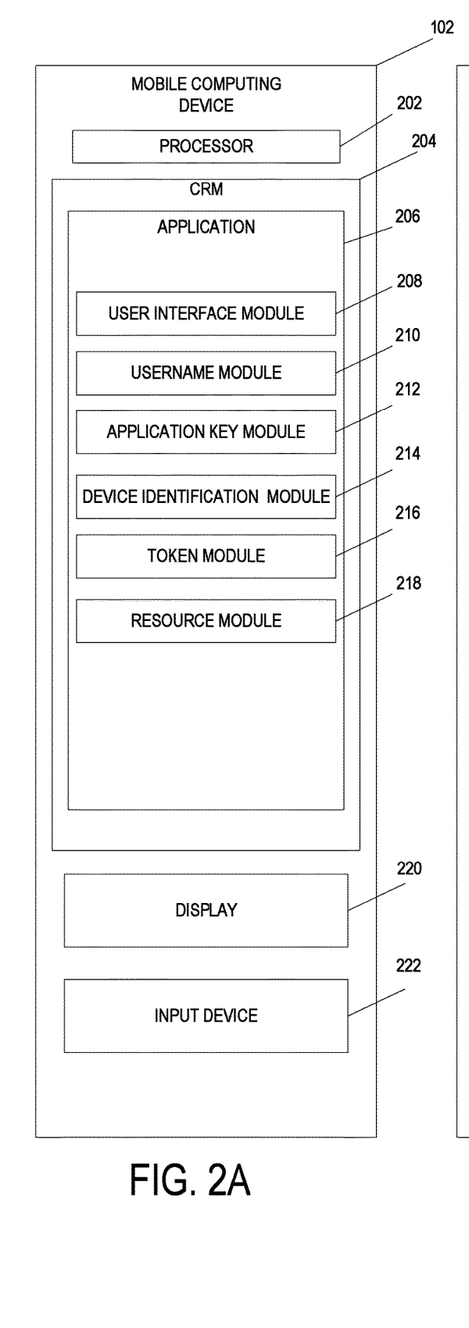
FIG. 2A is a block diagram of a mobile computing device according to an example embodiment.

FIG. 2A illustrates a block diagram of a mobile computing device 102 according to an example embodiment. According to an aspect of the present disclosure, the mobile computing device is a computer having a processor 202 and memory including but not limited to a laptop, desktop, tablet computer, mobile computing device (e.g., a smartphone) or a dedicated electronic device having a processor and memory. The mobile computing device 102 includes one or more processors 202 to process machine/computer-readable executable instructions and data and memory to store machine/computer-readable executable instructions and data including one or more applications 206. The processor 202 and memory are hardware. The memory includes random access memory (RAM) and non-transitory memory, e.g., one or more flash disks or hard drives. The non-transitory memory may include any tangible computer-readable medium including, for example, magnetic and/or optical disks, flash drives, and the like.

The mobile computing device 102 includes computer readable media (CRM) 204 on which the one or more applications 206 are stored. The computer readable media 204 may include volatile media, nonvolatile media, removable media, non-removable media, and/or another available medium that can be accessed by the processor. By way of example and not limitation, the computer readable media comprises computer storage media and communication media. Computer storage media includes non-transitory memory, volatile media, nonvolatile media, removable media, and/or non-removable media implemented in a method or technology for storage of information, such as computer/machine-readable/executable instructions, data structures, program modules, or other data. Communication media may embody computer/machine-readable/executable instructions, data structures, program modules, or other data and include an information delivery media or system.

The application 206 may be any application executable by the mobile computing device 102, e.g., a single unit of deployable executable code. In one example, the application 206 is an application provided by an employer and/or network resource manager such as an IT department. The application 206 may be an email client, a ticket management application, a sales application, a word processing application, a spreadsheet application, and other applications. The application 206 may request network resources comprising ticket management information, sales information, word processing information, spreadsheet information, and other information from the one or more databases 108. The application 206 may be downloaded from digital distribution platforms, e.g., the App Store and/or GOOGLE PLAY™, among others. The application 206 communicates messages with the RAA server 106. As an example, the application 206 is a web-based application viewed in a browser on the mobile computing device and/or a native application executed by the mobile computing device 102.

The application 206 includes a user interface module 208 to provide a user interface on a display of the mobile computing device 102. The application 206 further includes a username module 210 to receive a username and a password as input and transmit a representation of the username and the password to the RAA server 106 using hypertext transport protocol secure (HTTPS) and/or other protocols. The username and password may be encrypted using secure sockets layer (SSL) and/or other encryption protocols. The application also includes an application key module 212 to obtain an application key and an application key secret from the application 204 and transmit the application key and the application key secret to the RAA server. In one example, the application key and the application key secret may be embedded in source code, object code, and/or machine code of the application 206. The application key and the application key secret may be encrypted using a cryptographic hash function (e.g., SHA-1, MD5) to determine a hash-based message authentication code (HMAC) (Hash-based message authentication code). This cryptographic hash function allows the application key and the application key secret to be verified and authenticated. The output of the cryptographic hash function is a binary string (or opaque binary blob (OBB)) that may be encoded using Base64.

The application also includes a device identification module 214 to obtain a device identifier and a device identifier secret from the mobile computing device 102 and transmit the device identifier and the device identifier secret to the RAA server 106. The device identification module 214 may obtain the device identifier and the device identifier secret using an application programming interface (API) provided by an operating system of the mobile computing device 102. The device identifier and the device identifier secret may be encrypted using a cryptographic hash function (e.g., SHA-1, MD5) to determine a hash-based message authentication code (HMAC) (Hash-based message authentication code). The cryptographic hash function allows the device identifier and the device identifier secret to be verified and authenticated. The output of the cryptographic hash function is a binary string that may be encoded using Base64.

The application 204 also includes a token module 216 to receive a token from the RAA server 106 and store the token in memory. In addition, the application 206 includes a resource module 218 to request resources from the RAA server 106. The request may be a representational state transfer (REST) and/or a Simple Object Access Protocol (SOAP) request sent to the RAA server that identifies particular resources. As an example, the request may be a uniform resource locator (URL) comprising http://www.exampletickets.com/ getAllTicketsxml&ApplicationKey=coolapp&Application KeySecret=1234&DeviceIdentifier=myPhone&Device IdentifierSecret=6789&Token=abcd. This request may be a request for all tickets associated with the ticket management application and may be formatted according to a format of a ticket management application programming interface (API). The request is received by the RAA server 106. The RAA server 106 determines what resources are associated and identified with the request (e.g., all tickets associated with the ticket management application) and the RAA server 106 transmits a REST and/or SOAP response of a representation of the resources as Javascript Object Notation (JSON) and/or Extensible Markup Language (XML). When requesting resources, the resource module 218 transmits the token and the device identifier information to the RAA server 106. If the token is valid and the device identifier information is valid and the token is associated with the device identifier information, the RAA server 106 transmits a representation of the requested resources to the resource module 218 and the resource module 218 provides the representation of the requested resources to the user interface module 208 for display and interaction.

The mobile computing device 102 further includes a display 220 and an input device 222. The display 220 is used to display visual components of the application 206, such as at a user interface provided by the user interface module 208. In one example, the user interface may display the representation of the requested resources received by the resource module 218, e.g., a list of all tickets associated with the ticket management application and information associated with each ticket. The display 220 can include a cathode-ray tube display, a liquid-crystal display, a light-emitting diode display, a touch screen display, and other displays. The input device 222 is used to interact with the application 206 and may include a mouse, a keyboard, a trackpad, and/or the like. The input device 222 may be included within the display 220 if the display is a touch screen display. The input device 222 allows a user of the mobile computing device 102 to manipulate the representation of the requested resources received by the resource module 218.

Before the RAA server 106 provides access to resources in the database 108, the user and/or an administrator may register the application 206 for use by the mobile computing device 102. When the application 206 is launched for the first time, or in another situation, the application 206 may request access to the resources in the database 108 or in another location. In one example, the application 206 may ask for user approval before requesting access and indicates that registration, authentication, and authorization of the user, mobile computing device 102, and the application 206 is in process via the user interface module 208. In another example, the application 206 does not indicate that registration, authentication, and authorization of the user, mobile computing device 102, and the application 206 is in process, but the process may take place "behind the scenes" without user intervention. The application 206 may be registered using a web browser and/or within the application itself via the user interface module 208.

In cooperation with the username module 210, the application key module 212, and the device identification module 214, the web browser and/or the user interface module 208 provides an interface that a user may use to register the application 206. In one example, the process may begin in the application 206, and the application 206 may open the web browser for another aspect of the process. The process may conclude in the application 206 or the web browser may close or transition back to the application 206. In another example, the mobile computing device 102 may open a web browser and using the web browser, the user may select the application from a list of applications. In other words, the application 206 transmits the registration request to the RAA server 106 and/or the web browser transmits the registration request on behalf of the application to the RAA server 106.

Figure 2B:
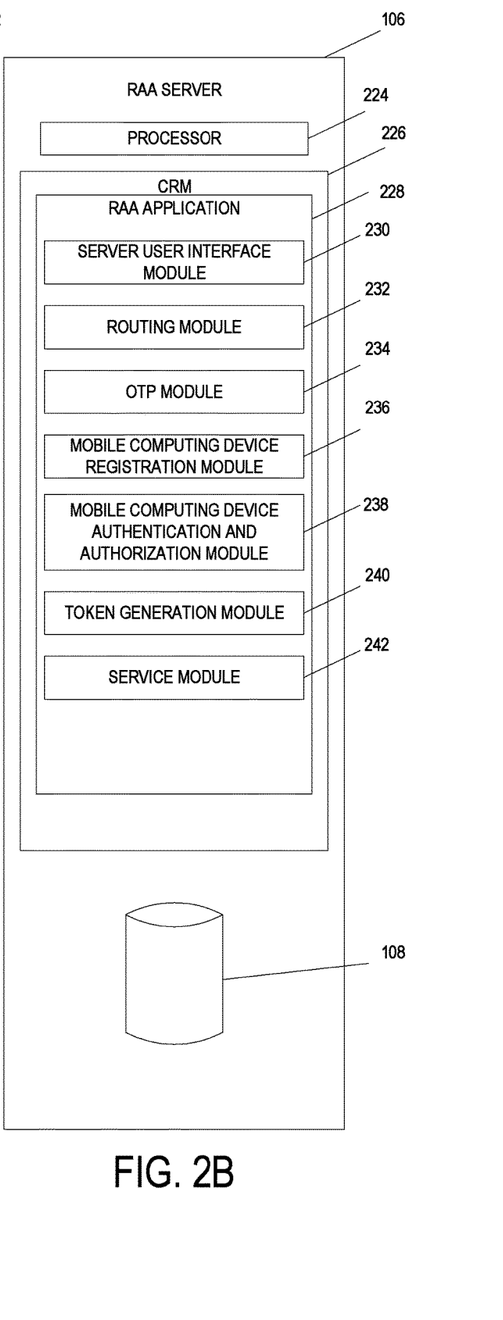
FIG. 2B is a block diagram of an RAA server according to an example embodiment.

FIG. 2B illustrates a block diagram of the RAA server 106 according to an example embodiment. According to an aspect of the present disclosure, the RAA server 106 is a computer having a processor 224 and memory. The RAA server 102 may be, for example, a laptop, a desktop, a server, a tablet computer, a mobile computing device (e.g., a smartphone) or a dedicated electronic device having a processor and memory. In an exemplary embodiment, the RAA server 106 comprises a hardware gateway running Intel Expressway, e.g., a software system or appliance to expose network services and resources to client computing devices such as the one or more mobile computing devices 102. The RAA server 106 includes one or more processors 224 to process data and memory to store machine/computer-readable executable instructions and data including an RAA application. The processor and memory are hardware. The memory includes random access memory (RAM) and non-transitory memory, e.g., one or more hard disks. The non-transitory memory may include any tangible computer-readable medium including, for example, magnetic and/or optical disks, flash drives, and the like. The data associated with the RAA application, username and password information, application key information, device identification information, and token information may be stored in a structured query language (SQL) server database, an open source distributed database management system such as a Not only SQL (NoSQL) database management system (e.g., Apache Cassandra), or another appropriate database management system the within memory. As an example, the data may be stored in the database 108. Additionally, the memory may also include a dedicated file server having one or more dedicated processors, random access memory (RAM), a Redundant Array of Inexpensive Disks hard drive configuration, an Ethernet interface or other communication interface, and a server-based operating system.

The RAA application may be a software application for registering, authenticating, and authorizing computing devices to use and access network resources. The RAA application comprises machine/computer-readable executable instructions that are executed by the processor 224 or another processor. The RAA application has access to the username and password information, application key information, device identifier information, and the token information that may be stored within the memory and/or the database 108. As an example, the RAA application may be stored in non-transitory memory. The RAA server 106 includes computer readable media 226 on which the RAA application 228 is stored. The computer readable media 226 may include volatile media, nonvolatile media, removable media, non-removable media, and/or another available medium that can be accessed by the processor. By way of example and not limitation, the computer readable media comprises computer storage media and communication media. Computer storage media includes non-transitory memory, volatile media, nonvolatile media, removable media, and/or non-removable media implemented in a method or technology for storage of information, such as computer/machine-readable/executable instructions, data structures, program modules, or other data. Communication media may embody computer/machine-readable/executable instructions, data structures, program modules, or other data and include an information delivery media or system.

The RAA application 228 includes a server user interface module 230 for receiving requests from mobile computing devices 102 and transmitting user interface information to the mobile computing devices 102. In addition, the RAA application 228 includes a routing module 232 to receive a request from a mobile computing device 102 and obtain information from the database 108 to verify that the request is a valid request. The routing module may temporarily store request information in a routing cache and/or a routing storage. The routing cache and/or routing storage may be stored in memory and/or the database 108. The RAA application 228 further includes a one-time-use password (OTP) module 234 to generate a one-time-use password and store the one-time-use password in the memory and/or the database 108. The one-time-use password may have a limited time that it is valid, e.g., twenty minutes, and may only be used once to register a mobile computing device 102. The RAA application 228 further includes a mobile computing device registration module 236 to receive requests from new and/or unknown mobile computing devices and transmit a generated one-time-use password directly to the application 206. The server user interface module 230 may transmit mobile computing device user interface information to generate an OTP user interface to receive entry of the one-time-user-password. The mobile computing device registration module 236 may transmit the one-time-user password via email and text message, among others. The mobile computing device registration module 236 receives a username and a password and verifies that the username and password are valid using the one or more tables in the database 108. In addition, the mobile computing device registration module 236 receives the device identifier information including the device identifier and the device identifier secret and the generated one-time-use password. The mobile computing device registration module 236 verifies that the one-time-use password is valid using the one or more tables in the database 108 and stores the device identifier information as first identifier information in the memory and/or the database 108.

Generally, various element of the RAA application are described as being implemented as various computing modules, which may involve a plurality of computer instructions being executed by a computing element or stored on a non-transitory media, and configured to perform the various operations of the system. While these modules are described as distinct operational blocks, it should be recognized that these operations may be combined and/or separated depending on the requirements of any particular implementation.

In response to a request from a registered mobile computing device, a mobile computing device authentication and authorization module 238 receives a username, a password, the device identifier information, and application key information and verifies that this information is valid. The device identifier information may include a representation of the device identifier and the device identifier secret and may be second identifier information. In addition, the application key information may include a representation of the application key and the application key secret. The database 108 includes a copy of each application key and application key secret associated with access to network resources and each device identifier and device identifier secret associated with access to network resources. The mobile computing device authentication and authorization module 238 queries the corresponding application key and the application key secret in the database, and performs the cryptographic hash function performed by the mobile computing device 102. In addition, the mobile computing device authentication and authorization module 238 queries the corresponding device identifier and the device identifier secret in the database, and performs the cryptographic hash function performed by the mobile computing device 102. The output of the cryptographic hash function is a binary string that may be encoded using Base64. The mobile computing device authentication and authorization module 238 determines whether the binary string representing the application key information and the binary string representing the device identifier information sent by the mobile computing device 102 matches the binary string representing the application key information and the binary string representing the device identifier information determined by the mobile computing device authentication and authorization module 238.

In other words, the mobile computing device 102 transmits a username, a password, application key information, and the device identifier information to the RAA server 106 using HTTP digest authentication. In one example, the application key information is a first application hash-based message authentication code and the device identifier information is a first device hash-based message authentication code. The username and password may be received in a first digest, the first application hash-based message authentication code may be received in a second digest, and the first device hash-based message authentication code may be received in a third digest. The RAA server 106 verifies that the username, the password, the application key information, and the device identifier information are valid.

The RAA server 106 locates a corresponding application key and application key secret in the database 108 and performs the cryptographic hash function on the application key and the application key secret to obtain a second application hash-based message authentication code. The RAA server 106 also locates a corresponding device identifier and device identifier secret in the database 108 and performs the cryptographic hash function on the device identifier and the device identifier secret to obtain a second device hash-based message authentication code. The RAA server 106 compares the first application hash-based message authentication code with the second application hash-based message authentication code and compares the first device hash-based message authentication code with the second device hash-based message authentication code to determine validity.

If this information is valid, a token generation module 240 generates a token having a time to live or expiration time, e.g., two hours, and transmits the token to the mobile computing device 102. The token and/or token information representing the token is stored in the memory and/or the database 108. A service module 242 receives a REST and/or SOAP request from a registered mobile computing device and a token, and verifies that the token is valid using the token and/or the token information in the database 108. The service module 242 may also receive the device identifier information as third device identifier information and verify that the device identifier information is valid and that the token is associated with the device identifier information. In other words, it may not be possible to use a valid token unless the token is associated with the mobile computing device and its associated device identifier information. The service module 242 determines what resources are associated and identified with the request and where the resources are located on the communication network 110. The service module 242 transmits a REST and/or SOAP response of a representation of the resources as Javascript Object Notation (JSON) and/or Extensible Markup Language (XML).

According to an example embodiment, the application key grants the application 206 specific access to particular network resources. The network resources may comprise a first resource, a second resource, and a third resource. If the application 206 uses information from the first resource but not the second resource or the third resource, the application key only grants access to the first resource. The application key does not grant access to the second resource or the third resource. In another case, the device identifier grants the device specific access to particular network resources. If the user of the mobile computing device 102 uses information from the first resource but not the second resource or the third resource, the device identifier only grants access to the first resource.

The application key is a string or code that identifies the application, its developer, and/or its user. The application key secret is also a string or code that identifies the application, its developer, and/or its user. The application key and the application key secret may be viewed similarly to a username/password pair. The device identifier is a string or code that uniquely identifies the device. The device identifier secret is also a string or code that uniquely identifies the device. The device identifier and the device identifier secret may also be viewed similarly to a username/password pair. The RAA server 106 may revoke a token and/or delete device identifier information from the database providing the resource owner and user greater control and flexibility in granting access. In one embodiment, an administrator may manually mark the device identifier as inactive in the database 108 or may disable the device identifier by using a web-based management portal provided by the RAA server 106, e.g., a security harness. In another example, the device identifier information and/or an associated token may be deleted, revoked, or removed from the database 108. In an even further example, an associated token may be disabled and/or expired using the web-based management portal. The associated token time-to-live also may be adjusted and/or lowered using the web-based management portal. If the mobile computing device 102 is inactive and does not make any request for network resources for a particular period of time, e.g., twelve months, the RAA server 106 may automatically remove or delete the device identifier information from the database 108. In another example, the administrator may receive a notification via the web-based management portal indicating that the device identifier information and/or the associated token may be removed or deleted from the database 108.

If a device identifier is marked as inactive and/or the device identifier is deleted from the database, when the mobile computing device 102 launches the application 206, the application 206 may display an error message on the display 220. In the alternative, the application 206 may display a user interface of the application on the display 220 but the application 206 may not have any access to data to populate the user interface. The application 206 executed by the mobile computing device 102 may be denied access to network resources by the RAA server 106.

In the event that an employee deletes the application 206 from the mobile computing device 102, the mobile computing device 102 may delete confidential information associated with the application, the application key, and the application key secret from the mobile computing device 102. However, the application key and the application key secret may not be deleted from the database 108. Additionally, if the employee deletes the application 206 from the mobile computing device 102, the mobile computing device 102 may delete the token from the mobile computing device 102. In some situations, when the application 206 is deleted from the mobile computing device 102, the mobile computing device 102 deletes the device identifier and the device identifier secret. However, if the employee deletes the application 206 from the mobile computing device 102, the associated device identifier and the device identifier secret may not be deleted from the database 108. It is possible that the employee may reinstall the application 206 at a later date.

An example table stored in the database 108 is shown below in Table 1.

TABLE 1

| Username | password | application key | application key secret | device identifier | device identifier secret | token |
|---|---|---|---|---|---|---|
| Jack | 1234abcD | wordprocessor | 11111 | jacksphone (A) | jackssecret | abcd1234 (A) |
| Diane | 5678wxyZ | spreadsheet | 22222 | dianesphone (I) | dianessecret | 1234abcd (E) |
| Bob | 8675309 | email | 33333 | bobstablet (D) | bobssecret | ab12cd34 (E) |

As shown in Table 1, "jacksphone" is denoted as active by the (A), e.g., owned by an employee of an employer and currently in use. "dianesphone" is denoted as inactive by the (I). The mobile computing device having the device identifier of "dianesphone" may be misplaced, e.g., temporarily lost but owned by an employee of an employer. "bobstablet" (is denoted as being deleted by the (D), e.g., decommissioned or no longer in use. The mobile computing device having the device identifier of "bobstablet" may be owned by an employee that has left an employer. The mobile computing device having the device identifier of "jacksphone" may be granted access to network resources. The mobile computing device having the device identifier of "dianesphone" may not be granted access to network resources. Although "dianesphone" may not have access to network resources associated with the application having the application key represented by "spreadsheet," "dianesphone" may have access to other applications such as personal applications and network resources associated with the personal applications. In the event that this mobile computing device is found, the mobile computing device will have access to at least the personal applications and the network resources associated with the personal applications. The mobile computing device having the device identifier of "bobstablet" may not be granted access to network resources. "bobstablet" may have access to other applications such as personal applications and network resources associated with the personal applications. The token "1234abcd" associated with jacksphone is denoted as active by the (A). The token "1234abcd" associated with dianesphone is denoted as expired by the (E). The token "ab12cd34" associated with bobstablet is denoted as expired by the (E).

Figure 3:
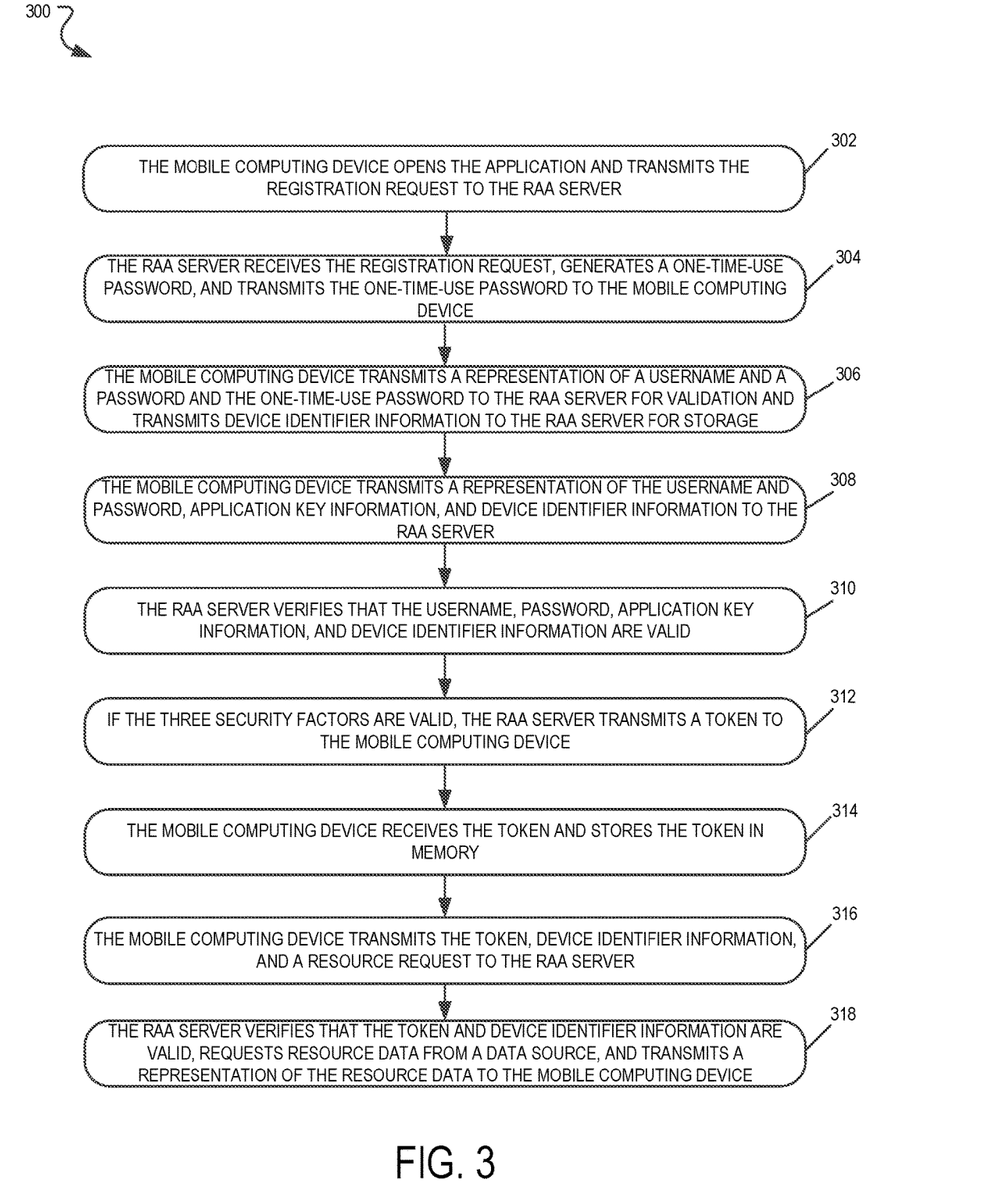
FIG. 3 is a flowchart illustrating a method for registering, authenticating, and authorizing the mobile computing device according to an example embodiment.

FIG. 3 is a flowchart of a process 300 for registering, authenticating, and authorizing the mobile computing device 102 according to an example embodiment. The process 300 shown in FIG. 3 begins in step 302.

In step 302, the mobile computing device 102 opens the application and transmits a registration request to the RAA server 106. In another example, the mobile computing device 102 may open a web browser and using the web browser, the user may select the application from a list of applications. In other words, the application transmits the registration request to the RAA server 106 and/or the web browser transmits the registration request on behalf of the application to the RAA server 106. The registration request may include a representation of a username and a password. In step 304, the RAA application 228 of the RAA server 106 receives the registration request, generates a one-time-use password, and transmits the one-time-use password to the mobile computing device 102. The RAA application 228 of the RAA server 106 may verify the username and the password before transmitting the one-time-use-password to the mobile computing device 102. In step 306, the mobile computing device 102 receives the one-time-use password and determines device identifier information. The mobile computing device 102 transmits the one-time-use password and the device identifier information, e.g., first device identifier information, in addition to a representation of a username and a password to the RAA server 106. The RAA server 106 verifies that the username, the password, and the one-time-use password are valid and stores the device identifier information in the database 108.

In step 308, the mobile computing device 102 transmits the representation of the username, the password, application key information, and the device identifier information to the RAA server 106. In step 308, the device identifier information is second device identifier information. In one example, the application key information is a first application hash-based message authentication code and the device identifier information is a first device hash-based message authentication code. In step 310, the RAA server 106 verifies that the username, the password, the application key information, and the device identifier information are valid. The RAA server 106 locates a corresponding application key and application key secret and performs the cryptographic hash function on the application key and the application key secret to obtain a second application hash-based message authentication code. The RAA server 106 also locates a corresponding device identifier and device identifier secret and performs the cryptographic hash function on the device identifier and the device identifier secret to obtain a second device hash-based message authentication code. The RAA server 106 compares the first application hash-based message authentication code with the second application hash-based message authentication code and compares the first device hash-based message authentication code with the second device hash-based message authentication code to determine validity. If the three security factors comprising the (1) username and the password, (2) the application key information, and (3) the device identifier information are valid, in step 312, the RAA server 106 generates a token and transmits the token to the mobile computing device 102. The token may have an expiration time or a time-to-live.

In step 314, the mobile computing device 102 receives the token and stores the token in memory. In step 316, the mobile computing device 102 transmits the token, the device identifier information, and a resource request to the RAA server 106. In step 316, the device identifier information is third device identifier information. In step 318, the RAA server 106 verifies that the token and the third device identifier information are valid, requests resource data from a network datasource connected to the communication network 110, e.g., the database 108, and transmits a representation of the resource data to the mobile computing device 102. The mobile computing device 102 receives the representation of the resource data and optionally displays the representation of the resource data in the user interface on the display 220. The third device identifier information is a first device hash-based message authentication code. The RAA server 106 locates a corresponding device identifier and device identifier secret and performs the cryptographic hash function on the device identifier and the device identifier secret to obtain a second device hash-based message authentication code. In step 318, the RAA server 106 compares the first device hash-based message authentication code with the second device hash-based message authentication code to determine validity of the third device identifier information.

According to an exemplary embodiment, each mobile computing device deemed to have access to the network resources has a unique device identifier stored in the database 108. In addition each application has a unique application key stored in the database 108. In the event that an employee leaves an employer or a mobile computing device is lost, stolen, or compromised, the employer may disable access to a specific application and/or a specific mobile computing device by deleting a unique device identifier and/or a device identifier secret from the database. When the unique device identifier and/or the device identifier secret are disabled or deleted from the database 108 and the mobile computing device 102 executes the specific application, the specific application may be denied access by the RAA server 106. In this situation, in step 316, when the RAA server 106 compares the first device hash-based message authentication code with the second device hash-based message authentication code, the device identifier information may be invalid and mobile computing device 102 may be denied access by the RAA server 106. The first device hash-based message authentication code may not match the second device hash-based message authentication code. The employer need not resort to measures such as deleting all data stored in memory on the mobile computing device 102, reinstalling an operating system on the mobile computing device 102, and/or restoring the mobile computing device 102 to factory settings.

According to an example embodiment, if a token expires, the user may refresh the token without completing the registration process again. The token may expire after the time-to-live and the user interface module 208 of the application 206 may display a refresh user interface on the display 220 for refreshing the token. The user may populate the user interface with refresh information (e.g., the username and the password) and the application 206 transmits refresh information (e.g., a representation of the username and the password) to the RAA server 106. The RAA server 106 may receive the refresh information and transmit a refreshed token to the token module 216. The refresh information may include the application key, the application key secret, the device identifier, and the device identifier secret, among other information. In another example embodiment, the administrator of the RAA server 106 may force a user to refresh the token by forcing a timeout of the token using the web-based management portal. In an even further embodiment, if a device identifier and/or a device identifier secret are disabled by the administrator of the RAA server 106 using the web-based management portal, the token may not be refreshed.

Figure 4:
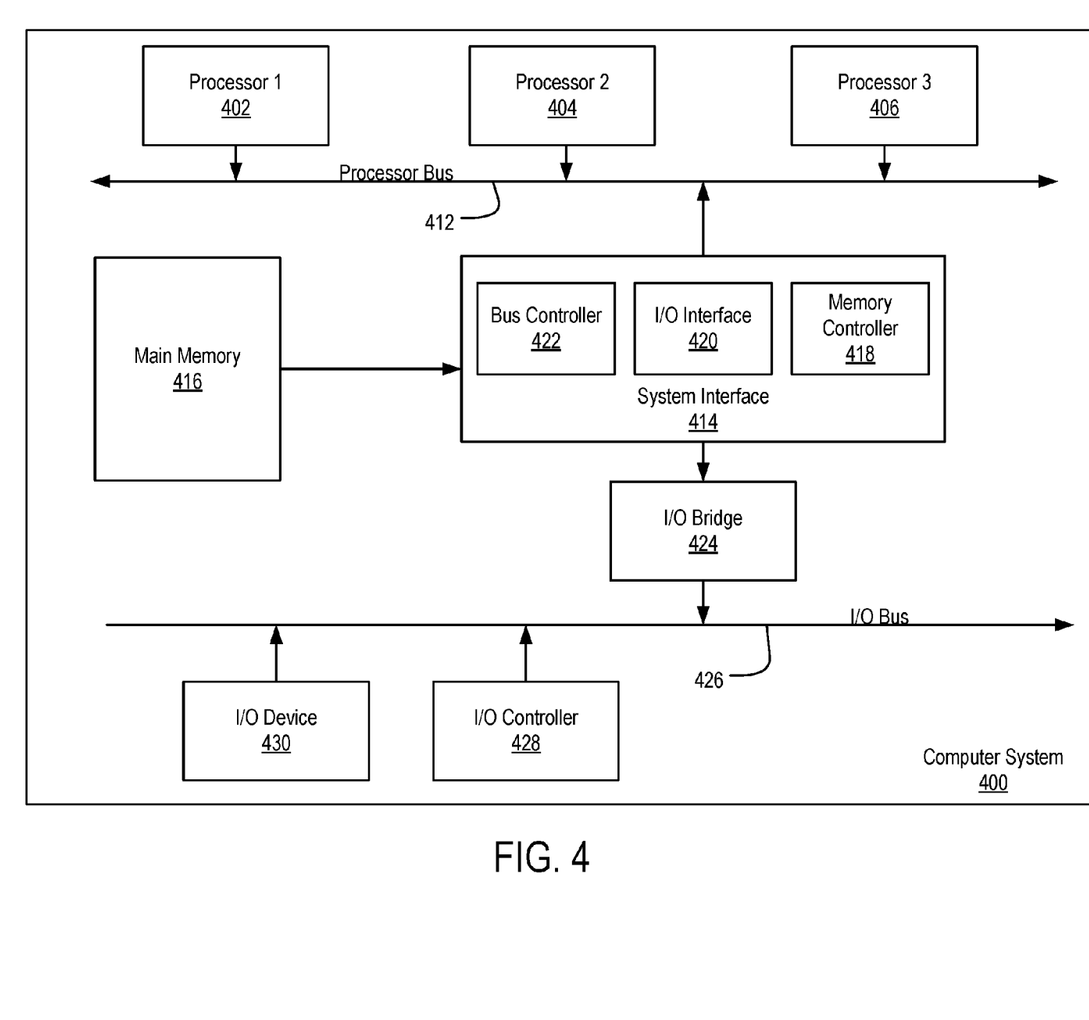
FIG. 4 is a diagram illustrating an example of a computing system which may be used in implementing embodiments of the present disclosure.

FIG. 4 is a block diagram illustrating an example of a computing device or computer system 400 which may be used in implementing the embodiments of the components of the network disclosed above. For example, the computing system 400 of FIG. 4 may be used to implement the various components of the application 206 and the RAA application 228 discussed above. The computer system (system) includes one or more processors 402-406. Processors 402-406 may include one or more internal levels of cache (not shown) and a bus controller or bus interface unit to direct interaction with the processor bus 412. Processor bus 412, also known as the host bus or the front side bus, may be used to couple the processors 402-406 with the system interface 414. System interface 414 may be connected to the processor bus 412 to interface other components of the system 400 with the processor bus 412. For example, system interface 414 may include a memory controller 414 for interfacing a main memory 416 with the processor bus 412. The main memory 416 typically includes one or more memory cards and a control circuit (not shown). System interface 414 may also include an input/output (I/O) interface 420 to interface one or more I/O bridges or I/O devices with the processor bus 412. One or more I/O controllers and/or I/O devices may be connected with the I/O bus 426, such as I/O controller 428 and I/O device 430, as illustrated.

I/O device 430 may also include an input device (not shown), such as an alphanumeric input device, including alphanumeric and other keys for communicating information and/or command selections to the processors 402-406. Another type of user input device includes cursor control, such as a mouse, a trackball, or cursor direction keys for communicating direction information and command selections to the processors 402-406 and for controlling cursor movement on the display device.

System 400 may include a dynamic storage device, referred to as main memory 416, or a random access memory (RAM) or other computer-readable devices coupled to the processor bus 412 for storing information and instructions to be executed by the processors 402-406. Main memory 416 also may be used for storing temporary variables or other intermediate information during execution of instructions by the processors 402-406. System 400 may include a read only memory (ROM) and/or other static storage device coupled to the processor bus 412 for storing static information and instructions for the processors 402-406. The system set forth in FIG. 4 is but one possible example of a computer system that may employ or be configured in accordance with aspects of the present disclosure.

According to one embodiment, the above techniques may be performed by computer system 400 in response to processor 404 executing one or more sequences of one or more instructions contained in main memory 416. These instructions may be read into main memory 416 from another machine-readable medium, such as a storage device. Execution of the sequences of instructions contained in main memory 416 may cause processors 402-406 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 416.

Common forms of machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

What is claimed is:

1. A system, comprising:
a server comprising at least one processor to:
receive a registration request, the registration request comprising a representation of a username and a password;
verify the username and the password and transmit a one-time-use password;
receive the one-time-use password and first device identifier information from a mobile computing device;
receive an access request from the mobile computing device comprising the representation of the username and the password, second device identifier information, and application key information;
verify the username, the password, the second device identifier information, and the application key information at the server, and transmit a token to the mobile computing device;
receive a resource request from the mobile computing device comprising the token and third device identifier information;
verify the token and the third device identifier information; and
transmit information associated with the resource request to the mobile computing device.

2. The system as recited in claim 1, the at least one processor further to:
store the first device identifier information in a memory, the first device identifier information comprising a first device identifier and a first device identifier secret.

3. The system as recited in claim 2, wherein the second device identifier information comprises a second device hash-based message authentication code.

4. The system as recited in claim 3, the at least one processor further to:
perform a cryptographic hash function on the first device identifier and the first device identifier secret to obtain a first device hash-based message authentication code; and
compare the first device hash-based message authentication code with the second hash-based message authentication code to verify the second device identifier information.

5. The system as recited in claim 2, wherein the third device identifier information comprises a third device hash-based message authentication code.

6. The system as recited in claim 5, the at least one processor further to:
perform a cryptographic hash function on the first device identifier and the first device identifier secret to obtain a first device hash-based message authentication code; and
compare the first device hash-based message authentication code with the third device hash-based message authentication code to determine that the resource request is valid,
wherein the information transmitted to the mobile computing device comprises a representation of a resource associated with the resource request to the mobile computing device.

7. The system as recited in claim 5, the at least one processor further to:
perform a cryptographic hash function on the first device identifier and the first device identifier secret to obtain a first device hash-based message authentication code; and
compare the first device hash-based message authentication code with the third hash-based message authentication code to determine that the resource request is invalid,
wherein the information transmitted to the mobile computing device comprises an indication that the resource request is invalid to the mobile computing device.

8. The system as recited in claim 1, wherein the application key information comprises a first application hash-based message authentication code based on an application key and an application key secret.

9. The system as recited in claim 2, the at least one processor further to:
disable at least one of the first device identifier and the first device identifier secret; and
deny the resource request from the mobile computing device.

10. The system as recited in claim 2, the at least one processor further to:
delete at least one of the first device identifier and the first device identifier secret; and
deny the resource request from the mobile computing device.

11. A method, comprising:
receiving, by at least one processor at a server, a registration request, the registration request comprising a representation of a username and a password;
verifying, by at least one processor, the username and the password and transmitting a one-time-use password;
receiving, by the at least one processor, the one-time-use password and first device identifier information from a mobile computing device;
receiving, by the at least one processor, an access request from the mobile computing device comprising the representation of the username and the password, second device identifier information, and application key information;
verifying, by the at least one processor, the username, the password, the second device identifier information, and the application key information at the server, and transmitting a token to the mobile computing device;

receiving, by the at least one processor, a resource request from the mobile computing device comprising the token and third device identifier information;

verifying the token and the third device identifier information; and transmitting, by the at least one processor, information associated with the resource request to the mobile computing device.

12. The method as recited in claim 11, further comprising: storing the first device identifier information in a memory, the first device identifier information comprising a first device identifier and a first device identifier secret.

13. The method as recited in claim 12, wherein the second device identifier information comprises a second device hash-based message authentication code.

14. The method as recited in claim 13, further comprising:
performing a cryptographic hash function on the first device identifier and the first device identifier secret to obtain a first device hash-based message authentication code; and
comparing the first device hash-based message authentication code with the second hash-based message authentication code to verify the second device identifier information.

15. The method as recited in claim 12, wherein the third device identifier information comprises a third device hash-based message authentication code.

16. The method as recited in claim 15, further comprising:
performing a cryptographic hash function on the first device identifier and the first device identifier secret to obtain a first device hash-based message authentication code; and
comparing the first device hash-based message authentication code with the third device hash-based message authentication code to determine that the resource request is valid,
wherein transmitting the information comprises transmitting a representation of a resource associated with the resource request to the mobile computing device.

17. The method as recited in claim 15, further comprising:
performing a cryptographic hash function on the first device identifier and the first device identifier secret to obtain a first device hash-based message authentication code; and
comparing the first device hash-based message authentication code with the third hash-based message authentication code to determine that the resource request is invalid,
wherein transmitting the information comprises transmitting an indication that the resource request is invalid to the mobile computing device.

18. The method as recited in claim 12, further comprising:
disabling at least one of the first device identifier and the first device identifier secret; and
denying the resource request from the mobile computing device.

19. The method as recited in claim 12, further comprising:
deleting at least one of the first device identifier and the first device identifier secret; and
denying the resource request from the mobile computing device.

20. A non-transitory computer-readable medium having instructions stored thereon that, when executed by at least one processor, cause the at least one processor to perform operations comprising:

receiving a registration request at a server, the registration request comprising a representation of a username and a password;

verifying the username and the password and transmitting a one-time-use password; receiving the one-time-use password and first device identifier information from a mobile computing device;

receiving an access request from the mobile computing device comprising the representation of the username and the password, second device identifier information, and application key information;

verifying the username, the password, the second device identifier information, and the application key information at the server, and transmitting a token to the mobile computing device;

receiving a resource request from the mobile computing device comprising the token and third device identifier information;

verifying the token and the third device identifier information; and transmitting information associated with the resource request to the mobile computing device.

* * * * *